June 11, 1957 L. JACOLEV ET AL Re. 24,328

CONVERSION OF HYDROCARBONACEOUS MATERIAL INTO SYNTHESIS GAS

Original Filed March 27, 1948

INVENTORS
LEON JACOLEV
LEON P. GAUCHER
BY
Daniel Stephan
J. H. Graham
ATTORNEYS

United States Patent Office

Re. 24,328
Reissued June 11, 1957

24,328

CONVERSION OF HYDROCARBONACEOUS MATERIAL INTO SYNTHESIS GAS

Leon Jacolev, Montclair, N. J., and Leon P. Gaucher, Beacon, N. Y., assignors to The Texas Company, New York, N. Y., a corporation of Delaware Original No. 2,606,826, dated August 12, 1952, Serial No. 17,518, March 27, 1948. Application for reissue August 16, 1956, Serial No. 604,580

4 Claims. (Cl. 48—196)

Figure 2:
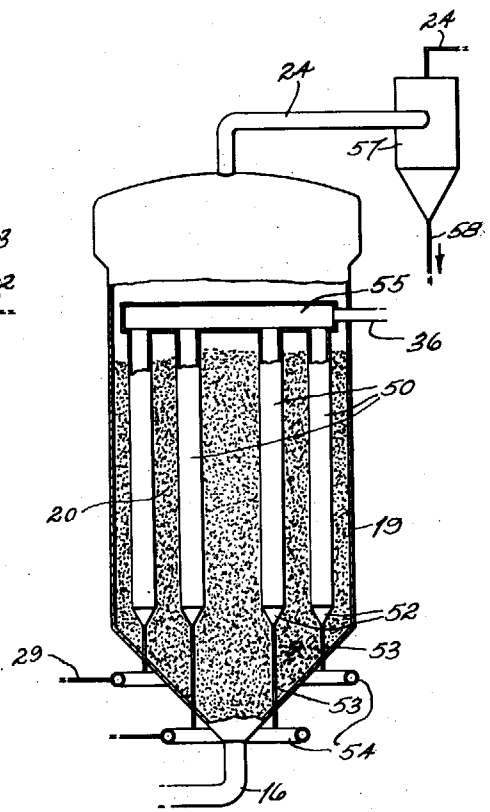

Matter enclosed in heavy brackets [ ] appears in the original patent but forms no part of this reissue specification; matter printed in italics indicates the additions made by reissue.

The present invention relates to the production of synthesis gas containing hydrogen and carbon monoxide in relative proportions suitable for the catalytic synthesis of hydrocarbons and the like, and is more particularly concerned with the conversion of hydrocarbonaceous materials into maximum yields of synthesis gas containing a desirably high porportion of hydrogen to carbon monoxide.

In accordance with the invention, a substantially improved yield of high purity synthesis gas is realized on the basis of minimum fuel and molecular oxygen requirements by subjecting a hydrocarbon to partial combustion with molecular oxygen and thereafter utilizing the sensible heat of the combustion products to support the endothermic catalytic reaction of additional hydrocarbon with water vapor and thus supplement the overall product, particularly in respect to the hydrogen content thereof.

More specifically, a hydrocarbon such as methane is subjected to partial combustion with a proper proportion of molecular oxygen, advantageously a pure or enriched stream containing 50 to 100 percent, and preferably more than 90 percent, of molecular oxygen at an elevated temperature at which maximum practical yields of hydrogen and carbon monoxide result.

The temperature of the combustion zone is maintained at as high a level as possible, for example, above about 2000° F., and preferably above 2300 to 2400° F., e. g., 2900 to 3000° F. where feasible. In general, higher temperature of reaction means greater yield of hydrogen and carbon monoxide.

The sensible heat of the hot effluent products of reaction is thereafter indirectly transferred to support the endothermic reaction of additional hydrocarbon with water vapor in the presence of a catalyst. The temperature of the endothermic reaction zone is in the range at which the hydrocarbon-steam reaction, by virtue of the catalyst, progresses effectively to produce high yields of additional hydrogen and carbon monoxide having a relatively high molar ratio of hydrogen to carbon monoxide, which range, however, is sufficiently below the temperature of hot gases from the combustion zone to permit efficient heat transfer.

Advantageously, the transfer of heat energy from the hot effluent gases of the combustion zone is effected as rapidly as possible, preferably at a rate akin to quenching, so that the equilibrium relationship of the hot effluent gaseous stream is not materially altered. To this end, it is advantageous to conduct the heat transfer through the medium of a dense fluid phase mass of preferably inert, solid particle material in indirect heat exchange relationship with the catalyst containing zone, herein known as the hydrocarbon-steam, or methane-steam reforming zone. Thus, the high temperature synthesis gas from the partial combustion of the hydrocarbon with molecular oxygen may be continuously conducted upwardly into a substantial mass of the solid inert material in dense fluid phase at a rate sufficient to maintain particle fluidization, simultaneously experiencing a sharp temperature drop to the lower temperature at which the solid is continuously maintained by regulated heat transfer to the methane-steam reforming zone.

In this way, the high temperature gas stream is rapidly cooled without material loss of desired constituents and sufficient heat energy is made available by virtue of such cooling to effect the catalytic endothermic reforming of substantial additional quantities of methane without the expenditure of additional fuel or molecular oxygen. So also as above stated, the overall proportion of the hydrogen produced is simultaneously increased.

The invention is accordingly of particular advantage in effecting maximum conversion of hydrocarbons into high purity synthesis gas with a minimum consumption of pure molecular oxygen and of extraneous fuel. It is also of particular advantage in effecting an appreciable increase in $H_2$:CO ratio without the expenditure of additional thermal energy. This follows from the discovery that the exothermic partial combustion step and the endothermic methane-steam reforming step operate separately to give highest overall yields of hydrogen and carbon monoxide. Where the products of partial combustion dilute the reactants of the methane-steam reforming step yields are materially impaired.

For example, the partial combustion of a hydrocarbon under conditions of good yeld results in a product having a substantially lower proportion of hydrogen than would be indicated by the stoichiometric relationships involved; thus, the partial combustion of methane with pure oxygen under more or less ideal commercial conditions of operation only results in a product having a molar ratio of hydrogen to carbon monoxide in the neighborhood of 1.85:1. Obviously, since the products formed by catalytic conversion of synthesis gas into liquid hydrocarbons usually have a collectively higher $H_2$:CO ratio, such a feed is not conducive of maximum theoretical yields. Moreover, a relatively higher proportion of hydrogen is usually advantageous in effecting the catalytic conversion of the reactants to hydrocarbons in the synthesis zone.

Moreover, with hydrocarbon starting materials other than methane, the discrepancy is more pronounced since higher hydrocarbons contain a lower relative proportion of hydrogen than methane and yield synthesis gas of correspondingly reduced hydrogen to carbon monoxide ratio.

It has been proposed to alleviate this condition by converting a portion of the product carbon monoxide into hydrogen by means of the water-gas shift reaction, by adding steam to the zone of partial combustion, or by subjecting the product, together with additional hydrocarbon and steam, to catalytic reforming. These proposals are unsatisfactory, however, in that they result in a varying though usually quite substantial loss of yield. Thus, for example, the addition of endothermically reacting water vapor to the zone of partial combustion inherently results in a lowered reaction temperature and accordingly a less favorable reaction equilibrium. These results appear to adversely affect product yield. Subsequent catalytic processing in the presence of added steam has a similar effect. Separate water-gas shifting obviously consumes desired carbon monoxide and involves processing losses.

It has been discovered that, in accordance with the present invention, these defects are substantially overcome and a novel and surprising increase in the yield of desired product is realized through the expenditure of a portion of the waste heat in the hot effluent gases from the combustion zone.

Partial combustion of methane may be effected at the desired high temperatures mentioned above in the presence preferably of relatively pure oxygen such that the proportion of oxygen is in the range up to about 20 percent excess over the stoichiometric quantity indicated for conversion of the hydrocarbon to hydrogen and carbon monoxide, that is, in the range of about 1.0 to about 1.3 atoms of oxygen per atom of carbon.

While the partial combustion may vary widely, the invention particularly contemplates effecting the reaction at, or preferably above, atmospheric pressure under the conditions described in detail in the copending application 717,267, filed December 19, 1946, now abandoned, to which reference is hereby made for details. More specifically, the reaction zone is preferably free from internal packing or catalyst, and has an internal length-to-radius ratio within the range of about 0.67:1–10:1, preferably about 1:1–4:1. As a result of this feature, the reactants tend to reach an equilibrium condition corresponding to maximum yield, with due regard to prevention of carbon formation and the like.

The hot products of reaction flow from the zone of partial combustion directly into a dense fluid phase of inert solid particles at a lower temperature in the range of from about 1200 to 2000° F., but preferably about 1500 to 1800° F., transferring heat indirectly to the endothermic methane-steam reforming step.

In order to explain the invention in greater detail reference is had to the accompanying drawing, representing more or less diagrammatically two specific embodiments thereof.

Figure 1:
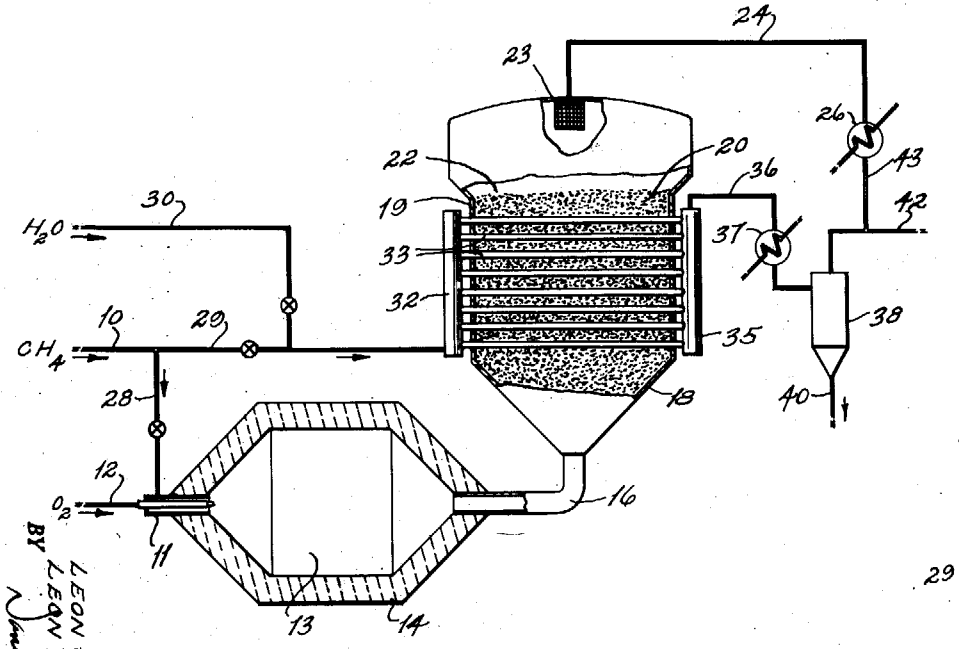

In Fig. 1, an incoming stream of a hydrocarbon gas, such as methane, is introduced through line 10, the major portion of this stream passing via pipe 28 to burner nozzle 11. A stream of oxygen of greater than 95 percent purity is supplied through pipe 12 to an internal passage of the burner 11. The two streams of gas emerge from respective concentric orifices of the mixing nozzle 11 into the interior 13 of a combustion chamber 14, in the relative proportion for partial combustion described above. Preferably, the reactant streams in pipes 10 and 12 are preheated to as high a temperature as is feasible, for example, 800–1000° F. or above so that the resulting temperature of the combustion zone 13 is continuously maintained at a high level, for example, 2300–2400° F. Preheating may be effected by the waste heat in the final product gas, or by any other convenient means.

The effluent synthesis gas comprising hydrogen and carbon monoxide in the molar ratio of about 1.85 to 1, at the elevated temperature of the zone of partial combustion, passes through a short conduit 16 into the conical bottom 18 of an exchanger 19, provided with a preferably dense fluid phase of suitable, inert, powdered solid material 20. The powder of the fluid phase may comprise sand, clay, silica, carborundum or any relatively inert solid, preferably in the particle size range of from about 10 mesh down to 400 mesh and finer. Advantageously, the fluid phase condition is maintained by the upflow of reactants. The product gas emerges from the upper pseudo-liquid level 22 of the fluid phase and passes through a filter 23 and outlet pipe 24 to a cooling exchanger 26.

Meanwhile ,a minor stream of methane is withdrawn from pipe 10 into branch pipe 29 where it is admixed with at least an equal molecular proportion of high temperature steam from pipe 30. The mixture passes by way of a header 32 through a plurality of pipes 33 packed with methane-steam reforming catalyst, and disposed in heat exchange relationship with the hot fluid phase of inert solid within the exchanger 18. More specifically, the pipes 33 continually absorb thermal energy from the dense fluid phase at a rate sufficient to thermally support the reformation of methane and steam into additional synthesis gas, approximately in accordance with the reaction:

$$CH_4+H_2O=CO+3H_2$$

The converted or reformed products are received by the outlet header 35 and pass by way of pipe 36 through a cooling exchanger or condenser 37 into a separator 38, from which any contained moisture is removed as at 39. The dry product separated at 38 passes overhead at 42 and admixes with the cooled gases from the exchanger 26, injected by way of pipe 43.

In the embodiment of Fig. 2, the reforming catalyst is likewise maintained in a dense fluid phase in order to facilitate heat transfer and maintain temperature uniformity therein. To this end, the hydrocarbon-steam reforming zone comprises a series of vertical tubes 50 distributed more or less uniformly through the fluid phase of inert solid 20, and containing the reforming catalyst in solid particle form. Each of the tubes 50 has a preferably conical lower extremity 52 to the apex of which inlet pipes 53 connect. As indicated, the inlet pipes 53 join with suitable bustle tubes or headers 54 which receive the reforming feed through pipe 29 as above.

The reaction products from the reformer tubes 50 are received in a suitable streamlined header 55 and discharged through a pipe 36.

The outlet pipe 24 of the exchanger is provided with a cyclone separator 57 in lieu of filter 23 for removing any possibly entrained solid particles, which are discharged as at 58. Otherwise, the embodiment described in Fig. 2 follows the construction previously disclosed.

In operation it will be appreciated, from the above, that the thermal requirements of the endothermic methane-steam reforming operation carried out within the catalyst tubes 33 or 50 determine the temperature of the fluid phase 20. In turn, the thermal requirements of reforming may be controlled by adjusting the rate of feed of the reactants, namely, hydrocarbon gas and steam supplied thereto. This is balanced with the sensible heat available in the hot gaseous stream supplied through pipe 16 so that the reforming zone operates continually at a reforming temperature of from 1500 to 2000° F., for example.

It has been found that in the case of methane, an additional quantity of from 10 to 20 percent and frequently up to 30 percent can be thus reformed by the thermal energy available in the hot combustion gases.

For example, operating as above, the generator gases at a temperature of about 2400° F., meeting the dense fluid phase in the exchanger 18, cool rapidly to a temperature just above 1600° F. uniformly prevailing in the fluid phase. This, in turn, holds the temperature within tubes 33 at about 1600° F. The stream of reactants passing through the reforming tubes 33 comprises methane, equal in quantity to about 20 percent of that being supplied to the combustion zone, in admixture with a molar quantity of steam equal to about twice that of the methane. Preferably, the mixture is preheated to, for example, about 1000° F. Under these conditions, the process proceeds to operate continuously, as indicated, with the products of catalytic reforming comprising a synthesis gas of a high hydrogen to carbon monoxide ratio supplementing the yield of product from the combustion zone.

For example, the following table compares results using natural gas comprising mainly methane with minor quantities of higher hydrocarbon gases, corresponding overall to the empirical formula $C_{1\cdot042}H_{4\cdot084}$:

| Run | Feed to Zone of Partial Combustion: Mols | | | Partial Combustion Zone Product: Mols | | | | Feed to Methane-Steam Reformer: Mols | | Final Mixed Product: Mols | | | | Total Feed: Mols | | |
|---|---|---|---|---|---|---|---|---|---|---|---|---|---|---|---|---|
| | Nat. Gas | Pure $O_2$ | Steam | $H_2$ | CO | $H_2$/CO | $H_2$+CO | Nat. Gas | Steam | $H_2$ | CO | $H_2$/CO | $H_2$+CO | Nat. Gas | Pure $O_2$ | Steam |
| A | 100. | 61.9 | None | 187. | 101. | 1.85 | 288. | 20.12 | 40.24 | 239.9 | 113.8 | 2.1 | 353.7 | 120.12 | 61.9 | 40.24 |
| B | 120.12 | 74.35 | do | 224.6 | 121.35 | 1.85 | 345.95 | | | 224.6 | 121.35 | 1.85 | 345.95 | 120.12 | 74.35 | |
| C | 100. | 61.9 | do | 187. | 101. | 1.85 | 288. | 20.12 | 40.24 | 221.8 | 101.67 | 2.1 | 323.51 | 120.12 | 61.9 | 40.24 |

In each of the cases covered, all reactants are preheated to approximately 1000° F. and the reactions carried out under a pressure of 250 p. s. i. g. The reforming catalysts comprises nickel oxide together with aluminum silicate.

In run A, the initial feed of natural gas and oxygen in suitable proportions for high yield of synthesis gas is reacted in a zone of partial combustion, yielding a product gas at about 2400° F. containing (basis 100 mols natural gas fed), 288 mols of hydrogen and carbon monoxide in the molar ratio of 1.85 to 1; thereafter, approximately 20 mol percent additional natural gas is reacted with steam at a temperature of 1600° F., continuously maintained by heat transfer from the hot products of the combustion zone, to give a total yield of 353.7 mols in the molar ratio of 2.1 to 1.

Run B compares the results of burning the same total quantity of natural gas with the same relative proportion of oxygen but without reforming. It is of striking significance, that, in spite of the increased consumption of oxygen, the overall yield of hydrogen and carbon monoxide is substantially less than in run A, and the hydrogen to carbon monoxide ratio of the product is only 1.85 to 1. Combustion temperature is the same as in the previous run.

Run C compares an operation where the partial combustion zone is operated identically as in Run A, the hot effluent gases being thereafter admixed with natural gas and steam, equivalent to that reformed in run A, and the mixture pased in contact with a methane-steam reforming catalyst. The results particularly emphasize the substantial loss of yield of total hydrogen and carbon monoxide encountered in compensating for the increased hydrogen to carbon monoxide ratio resulting from this method. The reduced yield is believed particularly striking in view of the fact that reforming temperature in this run, due to inherently decreased conversion, rises to the more favorable level of about 1770° F.

In accordance with an additional example wherein quantities of total feed materials identical with those employed in runs A and C are introduced simultaneously into the zone of partial combustion, the results are substantially identical with those indicated for run C. In this case, reactant preheat is identical with the preheat conditions observed in the other runs, and reaction is carried out under a pressure of 250 p. s. i. g.

It is significant to note that in the final example as well as in run C, the loss of desired product yield is accompanied by a substantial appearance of methane in the final product amounting to more than 12 mols on the foregoing basis of 100 mols of natural gas supplied to the zone of partial combustion. This constitutes approximately three percent on the basis of the total yield of hydrogen and carbon monoxide, as contrasted with only slightly greater than one percent of methane on the same basis in the product of run A. It follows therefore that, in addition to the improved yields shown above, the present invention materially overcomes contamination of the product by unreacted hydrocarbon.

From the foregoing, it is apparent that the present invention permits the production of synthesis gas more ideally suited to the direct catalytic production of hydrocarbons, not merely without loss of yield, but actually with a surprising increase in overall yield. This effect is achieved without increase in the pure oxygen requirement. Moreover, both the endothermic and exothermic reactions proceed continuously without the necessity for supplying external heat energy to the reaction zones. In particular, the process eliminates the necessity for combustion of additional fuel to furnish the thermal requirements of the catalytic endothermic reforming step.

While the invention has been described above with particular reference to methane and similar hydrocarbons, it is applicable in its broadest aspect to the treatment of hydrocarbonaceous feed materials in general. Advantageously, normally liquid hydrocarbons are vaporized by preheating before introduction into the reaction zones. In its broadest aspect, the invention contemplates the use of solid carbonaceous fuels, preferably, however, in a powdered or disintegrated form.

As intimated above, the invention is particularly advantageous in the conversion of hydrocarbons having a lower atomic H/C ratio than methane, as for example, ethane, propane, butane and the like. This follows because the proportion of hydrogen in the synthesis gas produced therefrom tends to be correspondingly reduced.

The invention also contemplates particularly the conversion of liquid hydrocarbons wherein the atomic H/C ratio is usually not substantially greater than 2:1. In spite of the fact that the resulting synthesis gas may require additional fortification with hydrogen, nevertheless the improvement achieved by the present invention may frequently be adequate in itself, and in any event, obviously contributes to economical operation.

In this connection, it is moreover pertinent to point out that in the case of the higher hydrocarbons, particularly liquid fuel oils and even materials of a character such as tar and coke, the exothermic heat energy made available in the zone of partial combustion is substantially greater than that resulting from the partial combustion of methane and thus permits a materially increased amount of reforming in the hydrocarbon-steam reforming zone.

So also, the increasing heat liberation in the case of higher hydrocarbons, usually makes it advisable as well as necessary to include a limited addition of steam or carbon dioxide in the feed to the combustion zone to prevent excessive temperature rise. The amount so added should be sufficient to hold the temperature at a level compatible with the structural limitations met with in practical operations, but not sufficient to lower the temperature below the optimum range discussed above. It may be substantial in the case of heavy oils and coals in spite of the fact that it cannot usually be tolerated, to any appreciable extent, in the case of light hydrocarbon gases due to excessive reduction of operating temperature.

Obviously, from the foregoing, the process of this invention results in maximizing efficiency in respect to pure oxygen consumption and compensates in part for the relatively low hydrogen content of the higher hydrocarbonaceous starting materials.

The term "molecular oxygen" as employed herein refers to free oxygen as contrasted with combined oxygen, of water vapor or such as frequently occurs in coals or other hydrocarbonaceous materials.

As indicated above, no invention, per se, is involved in the methane reforming catalyst, which may include any conventional catalyst effective for promoting the reforming of hydrocarbon by steam. Such catalysts conventionally consist of metal oxides, such as nickel or cobalt oxides, frequently in admixture with thoria or other oxides of the rare earths. Particularly effective catalysts for this purpose are the iron and nickel oxides, together with compounds of aluminum oxide and silica or boron and phosphorus, for example, aluminum silicate, bauxite, kaolin and the like. Nickel or cobalt oxide, promoted by alumina and supported by unglazed porcelain, is another example.

While mention has been made of the advantage of effecting heat transfer through the medium of a mass of inert solid particles maintained in dense fluid phase, the invention in its broadest aspect is not so limited, but contemplates transfer of sensible heat from the combustion gases to the hydrocarbon-steam reforming zone by any suitable effective indirect heat transfer instrumentality.

Obviously, many modifications and variations of the invention as hereinbefore set forth may be made without departing from the spirit and scope thereof, and therefore only such limitations should be imposed as are indicated in the appended claims.

What we claim is:

1. The method of converting carbonaceous material containing hydrogen into high yields of synthetic gas containing a mixture of hydrogen and carbon monoxide of relatively high hydrogen content, which comprises reacting said carbonaceous material in a partial combustion zone maintained above about 2000° F., with substantially pure oxygen in a proportion effective to result in a gaseous product composed essentially of $H_2$ and CO, injecting the hot effluent product gas into a dense fluid phase of solid particle marterial continuously maintained at a substantially lower temperature, thereby effecting continual quenching of the hot, effluent product gas and containually maintaining the said dense fluid phase of solid particle material at said substantially lower temperature by transferring thermal energy therefrom into a reforming zone disposed in heat transfer relationship therewith, passing a mixed stream of hydrocarbon and steam upwardly through said reforming zone, maintaining within said reforming zone a dense fluid phase of particulate solid reforming catalyst active at the temperature prevailing therein to convert said mixed stream of hydrocarbon and steam into $H_2$ and CO, and introducing said mixed stream of hydrocarbon and steam into the reforming zone at a rate sufficient to support said reforming catalyst in dense fluid phase condition as aforesaid, and to regulate the endothermic reaction of said hydrocarbon and steam in said reforming zone such that said fluid phase of solid particle material is maintained thereby at said lower temperature.

2. The method of converting a gaseous hydrocarbon into hydrogen and carbon monoxide which comprises oxidizing a stream of said hydrocarbon in a zone of partial combustion at a temperature in excess of about 2000° F. in the presence of molecular oxygen in a proportion effective to yield approximately maximum quantities of hydrogen and carbon monoxide, *injecting* [rapidly cooling the] hot effluent gaseous products of the zone of partial combustion *into a dense fluid phase of solid particle material disposed* [by passing said products] in [indirect] heat exchange *relationship* with an endothermic reaction zone containing a catalyst effective to convert mixture of hydrocarbon and steam directly into hydrogen and carbon monoxide at an elevated operating temperature substantially below the temperature of the hot effluent products of the zone of partial combustion, continuously feeding a stream of hydrocarbon and steam into contact with said catalyst at a rate such that said endothermic reaction zone is maintained continuously at said operating temperature, continuously withdrawing products of reaction from contact with said catalyst after substantial conversion has occurred, and admixing the product gas from the endothermic reaction zone with the cooled product gas from the partial combustion zone.

[3. The method according to claim 2 wherein the operating temperature maintained in the endothermic zone by indirect heat exchange with the hot effluent products of partial combustion is within the range above 1500° F.]

[4. The method according to claim 2 wherein rapid cooling of the hot effluent from the zone of partial combustion in indirect heat exchange with the endothermic reaction zone is effected by injecting said hot effluent into a dense fluid phase of solid particle material disposed in heat exchange relation with the said endothermic zone.]

[5. The method of converting a gaseous hydrocarbon into hydrogen and carbon monoxide which comprises oxidizing a stream of said hydrocarbon in a zone of partial combustion at a temperature in excess of about 2000° F. in the presence of molecular oxygen in a proportion effective to yield approximately maximum quantities of hydrogen and carbon monoxide, rapidly cooling the hot effluent gaseous products of the zone of partial combustion by passing said products in indirect heat exchange with an endothermic reaction zone containing a catalyst effective to convert mixtures of hydrocarbon and steam directly into hydrogen and carbon monoxide at an elevated operating temperature substantially below the temperature of the hot effluent products of the zone of partial combustion, continuously feeding a stream of hydrocarbon and steam into contact with said catalyst at a rate such that said endothermic reaction zone is maintained continuously at said operating temperature, and continuously withdrawing products of reaction from contact with said catalyst after substantial conversion has occurred.]

*6. The method of converting a gaseous hydrocarbon into hydrogen and carbon monoxide which comprises splitting said gaseous hydrocarbon feed into two streams, oxidizing one of said streams of hydrocarbon in a zone of partial combustion at a temperature in excess of about 2000° F. in the presence of molecular oxygen in a proportion effective to yield approximately maximum quantities of hydrogen and carbon monoxide, rapidly cooling the hot effluent gaseous products of the zone of partial combustion by passing said products in indirect heat exchange with an endothermic reaction zone containing a catalyst effective to convert mixtures of hydrocarbon and steam directly into hydrogen and carbon monoxide at an elevated operating temperature substantially below the temperature of the hot effluent products of the zone of partial combustion, continuously feeding the other of said streams of hydrocarbon in admixture with steam into contact with said catalyst at a rate such that said endothermic reaction zone is maintained continuously at said operating temperature, and continuously withdrawing products of reaction from contact with said catalyst after substantial conversion has occurred.*

*7. The method according to claim 6 wherein rapid cooling of the hot effluent from the zone of partial combustion in indirect heat exchange with the endothermic reaction zone is effected by injecting said hot effluent into a dense fluid phase of solid particle material disposed in heat exchange relationship with the said endothermic zone.*

(References on following page)

References Cited in the file of this patent or the original patent

UNITED STATES PATENTS

| | | |
|---|---|---|
| 1,951,774 | Russell et al. | Mar. 20, 1934 |
| 1,957,743 | Wietzel et al. | May 8, 1934 |
| 2,051,363 | Beekley | Aug. 18, 1936 |
| 2,425,754 | Murphree et al. | Aug. 19, 1947 |

| | | |
|---|---|---|
| 2,486,879 | Rees et al. | Nov. 1, 1949 |
| 2,493,498 | Peery | Jan. 3, 1950 |
| 2,579,843 | Mader | Dec. 25, 1951 |
| 2,618,542 | Alexander et al. | Nov. 18, 1952 |

OTHER REFERENCES

Taylor: "Industrial Hydrogen," page 150.